US012211638B2

(12) United States Patent
Cheng et al.

(10) Patent No.: US 12,211,638 B2
(45) Date of Patent: Jan. 28, 2025

(54) MAGNETIC-INDUCTANCE COMPONENT

(71) Applicant: SOUTHEAST UNIVERSITY, Jiangsu (CN)

(72) Inventors: Ming Cheng, Jiangsu (CN); Wei Qin, Jiangsu (CN); Zheng Wang, Jiangsu (CN); Xinkai Zhu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 87 days.

(21) Appl. No.: 17/608,934

(22) PCT Filed: Jan. 22, 2021

(86) PCT No.: PCT/CN2021/073267
§ 371 (c)(1),
(2) Date: Nov. 4, 2021

(87) PCT Pub. No.: WO2022/110527
PCT Pub. Date: Jun. 2, 2022

(65) Prior Publication Data

US 2022/0399158 A1 Dec. 15, 2022

(30) Foreign Application Priority Data

Nov. 26, 2020 (CN) ......................... 202011350276.4

(51) Int. Cl.
*H01F 17/04* (2006.01)
*H01F 27/30* (2006.01)

(52) U.S. Cl.
CPC .................................. *H01F 27/306* (2013.01)

(58) Field of Classification Search
CPC ..................................................... H01F 27/306
(Continued)

(56) References Cited

U.S. PATENT DOCUMENTS 1,653,107 A * 12/1927 Kochling ................ H01F 30/10 336/182
2004/0257187 A1 12/2004 Drummond et al.
(Continued)

FOREIGN PATENT DOCUMENTS

CN 104319075 A 1/2015
CN 104637659 A 5/2015
(Continued)

OTHER PUBLICATIONS

English translation of CN201732654 (Year: 2017).*
(Continued)

*Primary Examiner* — Ronald Hinson
(74) *Attorney, Agent, or Firm* — Muncy, Geissler, Olds & Lowe, P.C.

(57) ABSTRACT

A magnetic-inductance component is a multi-turn closed coil connected head to tail and wound around a magnetic circuit. A magnetic-inductance value of the magnetic-inductance component is adjusted by selecting metal conductors with different numbers of turns, materials, cross-sectional areas, and lengths to change an amplitude and phase of a magnetic flux of the magnetic circuit. The present invention changes the operating state and operating trajectory of a vector in the magnetic circuit by adding the magnetic-inductance component to the magnetic circuit or removing the magnetic-inductance component from the magnetic circuit, to make a state of a magnetic flux vector in the magnetic circuit to be consistent with a target magnetic flux vector state. A magnetic circuit vector model built by using the magnetic-inductance component as a core is more consistent with the actual physical situation, which is beneficial to the improvement of the accuracy of magnetic circuit analysis and calculation.

5 Claims, 6 Drawing Sheets

(58) Field of Classification Search
USPC .......................................................... 336/221
See application file for complete search history.

(56) References Cited

U.S. PATENT DOCUMENTS

| | | | | |
|---|---|---|---|---|
| 2008/0224809 | A1* | 9/2008 | Zhang | H01F 3/12 336/170 |
| 2008/0315982 | A1 | 12/2008 | Wei | |
| 2017/0323717 | A1* | 11/2017 | Dimitrovski | H01F 27/33 |
| 2018/0061562 | A1* | 3/2018 | Kanbe | H01F 17/043 |

FOREIGN PATENT DOCUMENTS

| | | | |
|---|---|---|---|
| CN | 105742047 | A | 7/2016 |
| CN | 106463227 | A | 2/2017 |
| CN | 106533130 | A | 3/2017 |
| CN | 206322578 | U | 7/2017 |
| CN | 207250270 | U | 4/2018 |
| CN | 107992663 | A | 5/2018 |
| CN | 207834098 | U | 9/2018 |
| CN | 108648899 | A | 10/2018 |
| CN | 207993649 | U | 10/2018 |
| CN | 111554471 | A | 8/2020 |
| CN | 111566917 | A | 8/2020 |
| CN | 111711368 | A | 9/2020 |
| CN | 111788642 | A | 10/2020 |
| DE | 102010020970 | A1 | 11/2011 |

OTHER PUBLICATIONS

English translation of JPH10116743 (Year: 1997).*
Cheng, et. al.,Magnetic-Inductance: Concept, Definition, and Applications, IEEE Transactions on Power Electronics, vol. 37, No. 10 (2022).
W. Qin, et. al., Compatibility Analysis Among Vector Magnetic Circuit Theory, Electric Circuit Theory, and Elecromagnetic Field Theory, IEEE vol. 11 (2023).

* cited by examiner

MAGNETIC-INDUCTANCE COMPONENT

TECHNICAL FIELD

The present invention relates to the field of magnetic circuit theory and application, and in particular, to the design of passive magnetic circuit components.

BACKGROUND

In the current textbooks and scientific research papers, an electric circuit usually contains three passive electrical components including resistance, inductance, and capacitance. Researchers can control the operating trajectory and operating state of each vector in an electric circuit by adding an electric circuit component to the electric circuit or removing an electric circuit component from the electric circuit. Compared with the electrical components in the electric circuit, currently there is only one passive component in the magnetic circuit, namely reluctance. By adding or removing a magnetic circuit component, only the modulus value of a magnetic circuit vector can be changed, but it is difficult to change the phase of the magnetic circuit vector. As a result, features of the magnetic circuit vector cannot be fully reflected. Therefore, how to supplement and optimize magnetic circuit components in the magnetic circuit theory is still a subject requiring extensive research by scholars in the art.

There is a lot of research work about the construction of magnetic circuit components and the design of magnetic circuits. The basic theorems and the magnetic circuit components of the magnetic circuit have been explained in many text books such as "Electric Machinery". A branchless magnetic circuit for the iron core of a transformer is modeled by using three physical quantities including a magnetomotive force (MMF), a magnetic flux, and a reluctance. In the book "Modem Permanent Magnet Motor Theory and Design," Tang Renyuan described the use of a "field-to-circuit" method to convert the calculation of a magnetic field into the calculation of a magnetic circuit, and implement the construction of an equivalent magnetic circuit of a permanent magnet motor by defining an equivalent magnetic circuit of a magnetic flux source and an equivalent magnetic circuit of an MMF source. In analogy to the theory of electrical networks, Vlado Ostovic from the University of Akron divided a magnetic field region into a plurality of branches connected in series or in parallel according to the geometric structure and magnetic flux direction of a squirrel cage induction motor. Each branch contains units such as a reluctance or an MMF source, forming a magnetic network model of a saturated squirrel cage induction motor. Zhu Ziqiang et al. from the University of Sheffield in the United Kingdom built a switched reluctance motor model using a nonlinear adaptive lumped parameter reluctance model. In the existing magnetic circuit theory or magnetic network theory, there are only three physical quantities, namely, the MMF, magnetic flux, and reluctance, and the change in the phase relationship between the magnetic flux and the MMF is not considered.

How to actively change the phase relationship between magnetic circuit vectors to cause the magnetic circuit vectors to change as expected is still a problem to be resolved.

SUMMARY

In view of the shortcomings of the related art, the technical problem to be resolved by the present invention is to provide a passive magnetic-inductance component, so that when the MMF is constant, not only the magnitude of the magnetic flux can be controlled, but also the phase relationship between the magnetic flux and the MMF can be controlled by adding the magnetic-inductance component to a magnetic circuit or removing the magnetic-inductance component from the magnetic circuit.

The present invention provides a magnetic-inductance component that changes the operating state and operating trajectory of a vector in a magnetic circuit. The magnetic-inductance component is a multi-turn closed coil connected head to tail and wound around the magnetic circuit. A magnetic-inductance value of the magnetic-inductance component is adjusted by selecting metal conductors with different numbers of turns, materials, cross-sectional areas, and lengths to change an amplitude and a phase of a magnetic flux of the magnetic circuit; or a state of a magnetic flux vector in the magnetic circuit is made consistent with a target magnetic flux vector state by adding the magnetic-inductance component to the magnetic circuit or removing the magnetic-inductance component from the magnetic circuit.

Further, in the magnetic-inductance component provided by the present invention, a coefficient $L_{mc}$ of the magnetic-inductance component is related to the number of turns $N_r$ of the closed coil and a resistance $R_r$ of the closed coil, that is, $$L_{mc} = \frac{N_r}{R_r},$$

where magnetic-inductance is measured in $\Omega^{-1}$; and when n magnetic-inductance components are connected in series, an expression for an equivalent magnetic-inductance value is $$L_{mceq}=L_{mc1}+L_{mc2}+ \ldots +L_{mcn-1}+L_{mcn},$$

or when n magnetic-inductance components are connected in parallel, an expression for an equivalent magnetic-inductance value is $$L_{mceq} = 1/\left(\frac{1}{L_{mc1}} + \frac{1}{L_{mc2}} + \ldots \frac{1}{L_{mcn-1}} + \frac{1}{L_{mcn}}\right).$$

Further, in the magnetic-inductance component provided by the present invention, the magnetic-inductance component has an obstructive effect on an alternating magnetic flux, but has no obstructive effect on a constant magnetic flux. An expression for a magnetic reactance is defined as $$X_{mc}=\omega L_{mc},$$

to describe the degree of the obstructive effect of the magnetic-inductance component on the alternating magnetic flux, where co is an angular frequency of the magnetic flux varied in the magnetic circuit.

Further, in the magnetic-inductance component provided by the present invention, a magnetic impedance value in the magnetic circuit is $$Z_{mc}=\sqrt{R_{mc}^2+X_{mc}^2},$$

and a magnetic impedance angle in the magnetic circuit is $$\varphi_{mc}=\arctan(X_{mc}/R_{mc}),$$

where $R_{mc}$ is a reluctance value of the magnetic circuit.

Further, in the magnetic-inductance component provided by the present invention, the Ohm's law of the magnetic circuit is used to verify whether a set magnetic-inductance value is consistent with a theoretical value; and an Ohm's law expression for the magnetic circuit is $$\dot{F}=(R_{mc}+j\omega L_{mc},$$

where j represents an imaginary unit, $R_{mc}$ is a reluctance value of the magnetic circuit, ω is an angular frequency of the magnetic flux varied in the magnetic circuit, $L_{mc}$ represents the magnetic-inductance value of the magnetic-inductance component, Φ represents the magnetic flux vector in the magnetic circuit, and $\dot{F}$ represents an MMF vector in the magnetic circuit.

Compared with the related art, the present invention adopts the above technical solution, having the following beneficial effects.

1. During designing of the magnetic circuit, any magnetic circuit topology or magnetic impedance network can be formed by designing the arrangement and combination of the magnetic circuit components such as a reluctance and a magnetic-inductance. By changing the magnetic impedance value of the magnetic circuit, the magnetic flux in the magnetic circuit can flow as expected by a designer. By changing the magnetic-inductance value of the magnetic circuit, features of the magnetic circuit can be changed so that the magnetic circuit can operate in a target state.
2. During modeling of the magnetic circuit, the phase relationship between the MMF and the magnetic flux can be accurately observed through the constructed magnetic-inductance component. Compared with a magnetic circuit including a reluctance only, a magnetic circuit vector model built by using the magnetic-inductance component as a core is more consistent with the actual physical situation, which is beneficial to the improvement of the accuracy of magnetic circuit analysis and calculation.
3. In terms of magnetic circuit calculation, different from complex operations used in the calculation of an equivalent electric circuit in the electric circuit theory, an equivalent magnetic circuit including the magnetic-inductance component can concisely express the physical situation of a single magnetic circuit and a plurality of electric circuits, providing a new tool for researchers in the field of magnetic circuit calculation.

DETAILED DESCRIPTION

The technical solution of the present invention will be further described below in detail with reference to the accompanying drawings.

The present invention provides a magnetic-inductance component. The basic idea of the present invention is to purposely change the operating state and operating trajectory of vectors in a magnetic circuit by adding the magnetic-inductance component to the magnetic circuit or removing the magnetic-inductance component from the magnetic circuit. For example, when the MMF force in the magnetic circuit is stable, the magnetic-inductance component is added to the magnetic circuit to change the magnitude of the magnetic flux in the magnetic circuit and the phase angle between the MMF and the magnetic flux, to make the state of the magnetic flux vector in the magnetic circuit consistent with a target magnetic flux vector state.

The magnetic-inductance component physically takes the form of a multi-turn closed coil connected head to tail and coil wound around the magnetic circuit, and is expressed as $L_{mc}$, where the subscript "mc" is the abbreviation of magnetic circuit. Corresponding to an inductance component in an electric circuit, a magnetic-inductance $L_{mc}$ has an obstructive effect on an alternating magnetic flux, but has no obstructive effect on a constant magnetic flux.

Further, a calculation formula for the magnetic-inductance is $$L_{mc} = \frac{N_r^2}{R_r},$$

where $R_r$ is a resistance of the closed coil, and the magnetic-inductance is measured in $\Omega^{-1}$. This formula corresponds to the relationship between the electrical inductance and the reluctance in the electric circuit, that is, $$L = \frac{N_L^2}{R_{mc}},$$

where $R_{mc}$ is a reluctance value of the magnetic circuit. The magnitude of a magnetic-inductance value is related to the number of turns of the closed coil and the resistance of the closed coil. The magnetic-inductance value of the magnetic-inductance component can be adjusted by selecting metal conductors with different numbers of turns, materials, cross-sectional areas, and lengths. When the frequency of the magnetic flux in the magnetic circuit is high, the resistance value of the magnetic-inductance component changes due to the skin effect. In this case, an AC resistance value should be used to calculate the magnetic-inductance value.

Figure 1:
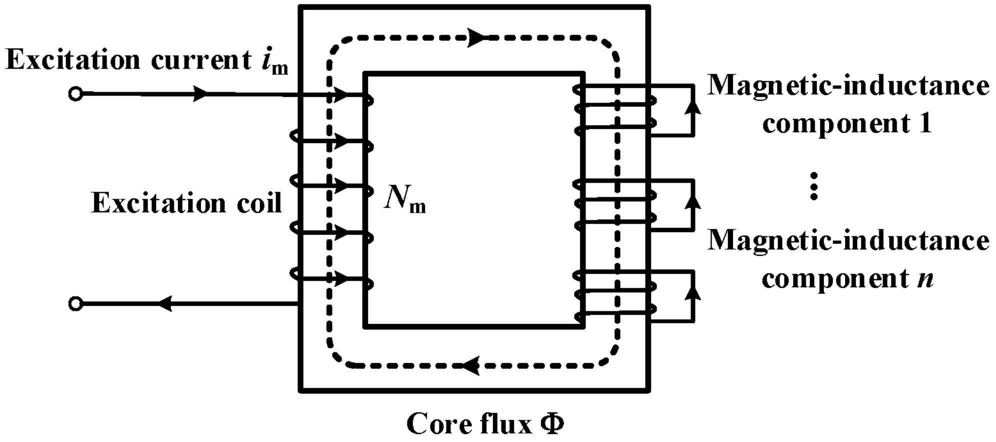
FIG. 1 is a schematic diagram showing a plurality of magnetic-inductance components connected in series according to the present invention.
Figure 2:
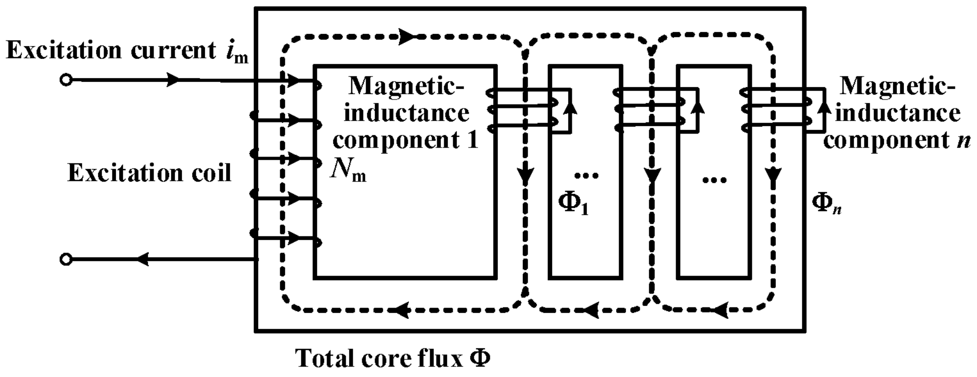
FIG. 2 is a schematic diagram showing a plurality of magnetic-inductance components connected in parallel according to the present invention.

Further, corresponding to the inductance component in the electric circuit, when n magnetic-inductance components are connected in series, as shown in FIG. 1, an expression for an equivalent magnetic-inductance value is $$L_{mceq}=L_{mc1}+L_{mc2}+ \ldots +L_{mcn-1}+L_{mcn};$$

or when n magnetic-inductance components are connected in parallel, as shown in FIG. 2, an expression for an equivalent magnetic-inductance value is $$L_{mceq} = 1/\left(\frac{1}{L_{mc1}} + \frac{1}{L_{mc2}} + \dots \frac{1}{L_{mcn-1}} + \frac{1}{L_{mcn}}\right).$$

Further, in order to describe the degree of the obstructive effect of the magnetic-inductance component on the alternating magnetic flux, an expression for a magnetic reactance is defined as $$X_{mc}=\omega L_{mc},$$

where w is an angular frequency of the magnetic flux varied in the magnetic circuit.

Further, an expression for the reluctance in the magnetic circuit is defined as $$R_{mc} = \frac{l_m}{\mu_m s_m},$$

where $l_m$ is an equivalent length that the magnetic flux flows around the magnetic circuit, $S_m$ is an equivalent cross-sectional area that the magnetic flux flows around the magnetic circuit, and $\mu_m$ is a magnetic permeability of the material of the magnetic circuit. The reluctance represents a constant obstructive effect of the magnetic circuit on the magnetic flux, which obstructs both the alternating magnetic flux and the constant magnetic flux. In a magnetic circuit including no magnetic-inductance component, when the MMF is constant, the reluctance can change the magnitude of the magnetic flux, but does not change the phase of the magnetic flux.

Further, corresponding to the definition of impedance in the electric circuit, the reluctance and the magnetic reactance constitute a magnetic impedance. A magnetic impedance value in the magnetic circuit can be calculated by using $$Z_{mc}=\sqrt{R_{mc}^2{+}{+}X_{mc}^2},$$

and a magnetic impedance angle in the magnetic circuit can be calculated by using $$\varphi_{mc}=\arctan(X_{mc}/R_{mc}).$$

The magnetic reactance and the reluctance can be respectively calculated by using a formula $$X_{mc}=Z_{mc}\sin\varphi_{mc}$$

and *a* formula $$R_{mc}=Z_{mc}\cos\varphi_{mc}.$$

Further, a magnetic circuit topology composed of four magnetic circuit components including an MMF, a magnetic flux, a reluctance, and a magnetic-inductance satisfies the Ohm's law of the magnetic circuit, that is, $$\dot{F}=(R_{mc}+j\omega L_{mc})\Phi.$$

In the present invention, a process of changing the state of the magnetic circuit by adding the magnetic-inductance component is as follows:

An amplitude (effective value) of the magnetic flux in the magnetic circuit is set to constant $\|\Phi_1\|$, and a phase between the MMF and the magnetic flux is set to $\varphi_{me1}$. When the magnetic circuit operates stably, a reluctance value $R_{mc}$ and an initial magnetic-inductance value $L_{mc0}$ in the magnetic circuit are calculated by using a formula $$\dot{F}=(R_{mc}+j\varphi L_{mc0})\Phi.$$

According to the calculated reluctance value $R_{mc}$ and a designed target magnetic impedance angle $\varphi_{mc1}$, a target magnetic-inductance value $L_{mc1}$ is calculated by using a formula $$\varphi_{mc1}=\arctan(\omega L_{mc1}/R_{mc}).$$

A magnetic-inductance value $$L_{mc2}=L_{mc1}-L_{mc0}$$

that needs to be increased in the magnetic circuit is calculated based on a difference between the initial magnetic-inductance value and the target magnetic-inductance value. The number of turns $N_r$ and the resistance $R_r$ of the closed coil are selected according to a calculation formula $$L_{mc2}=N/R_r$$

for the magnetic-inductance value, and the material, length, and cross-sectional area of the closed coil are selected according to the resistance value $R_r$ of the closed coil. According to the physical properties of the selected closed coil, the magnetic-inductance component is connected in series or in parallel in the magnetic circuit, thus completing the addition of the magnetic-inductance component to the magnetic circuit. If there are many branches in the magnetic circuit, a magnetic-inductance component can be added to each branch according to actual needs of the branch.

In a magnetic circuit formed by a transformer, an amplitude of a target magnetic flux is set to $$\|\Phi_1\|=0.5T,$$

and a target magnetic impedance angle is set to $$\varphi_{mc1}=58°.$$

Figure 3:
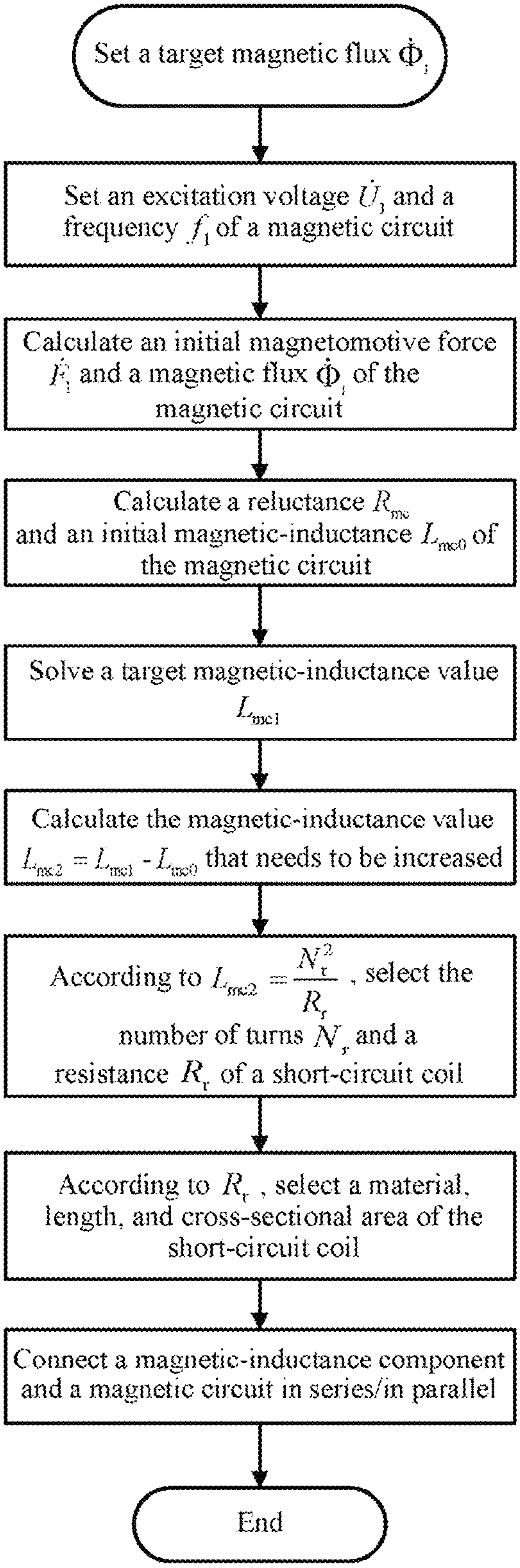
FIG. 3 is a flowchart of changing the operating state of a magnetic circuit by a magnetic-inductance component according to the present invention.
Figure 4:
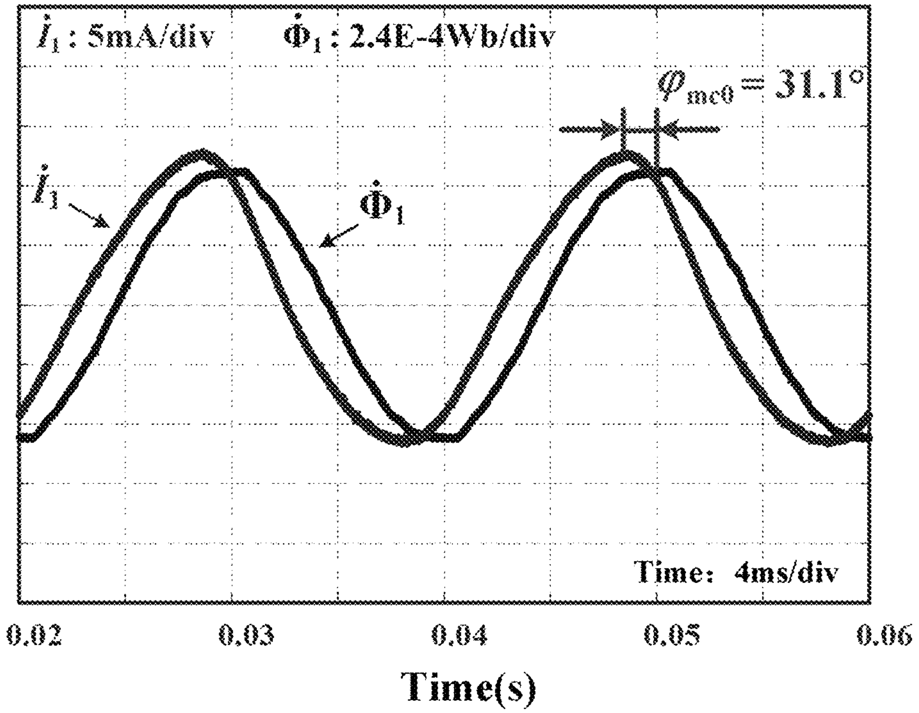
FIG. 4 is a waveform diagram of an initial excitation current and an initial magnetic flux of a transformer according to the present invention.

An initial magnetic circuit is changed into a target magnetic circuit by adding a magnetic-inductance component to the magnetic circuit. The flowchart is as shown in FIG. 3. First, an excitation frequency of the transformer is set to $$f_1=50Hz,$$

and an excitation voltage of the transformer is set to $\dot{U}_1$. When the transformer operates stably, waveforms of an excitation current $\dot{I}_1$ and a magnetic flux $\Phi_1$ of the magnetic circuit are as shown in FIG. 4. According to a formula $$\dot{F}_1=(R_{mc}+j\omega L_{mc0})\Phi_1,$$

a reluctance value $R_{mc}$ of the magnetic circuit can be solved. An initial magnetic-inductance value is $$L_{mc0}=43.34\Omega^{-1},$$

and an initial magnetic impedance angle $$\varphi_{mc0}=31.1°$$

can be obtained by using $$\varphi_{mc0}=\arctan(\omega L_{mc0}/R_{mc}).$$

Because the reluctance value $R_{mc}$ of the magnetic circuit is related to the excitation frequency $f_1$ of the magnetic circuit and the magnetic flux $\Phi_1$ of the magnetic circuit, the reluctance $R_{mc}$ basically does not change when the excitation frequency and the magnetic flux remain unchanged. A target magnetic-inductance value $$L_{mc1}=111.72\ \Omega^{-1}$$

can be obtained according to the target magnetic impedance angle $$\varphi_{mc1}=58°$$

and a formula $$\omega L_{mc1}=R_{mc}\tan\varphi_{mc1}.$$

Therefore, the magnetic-inductance value that should be increased in the magnetic circuit is $$L_{mc2}=L_{mc1}-L_{mc0}=68.35\ \Omega^{-1}.$$

By designing the arrangement and combination of the number of turns, material, length, and cross-sectional area of the multi-turn closed coil, a plurality of multi-turn closed coils that meet the requirements can be obtained. In the present invention, one turn of copper wire with a cross-sectional diameter of 0.5 mm is selected as the magnetic-inductance component to be connected in series in the magnetic circuit. The selected closed coil is measured by using a milliohm meter, and the measured resistance value is 14.63 mΩ. According to the calculation formula $$L_{mc}=\frac{N_r^2}{R_r}$$

for the magnetic-inductance, the magnetic-inductance value is 68.353 $\Omega^{-1}$, which meets the requirements on the required magnetic-inductance component.

Figure 5:
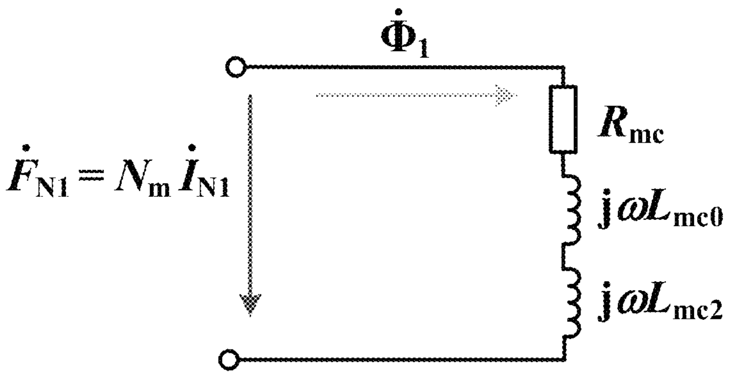
FIG. 5 is an equivalent magnetic circuit diagram of a transformer to which a magnetic-inductance component is added according to the present invention.
Figure 6:
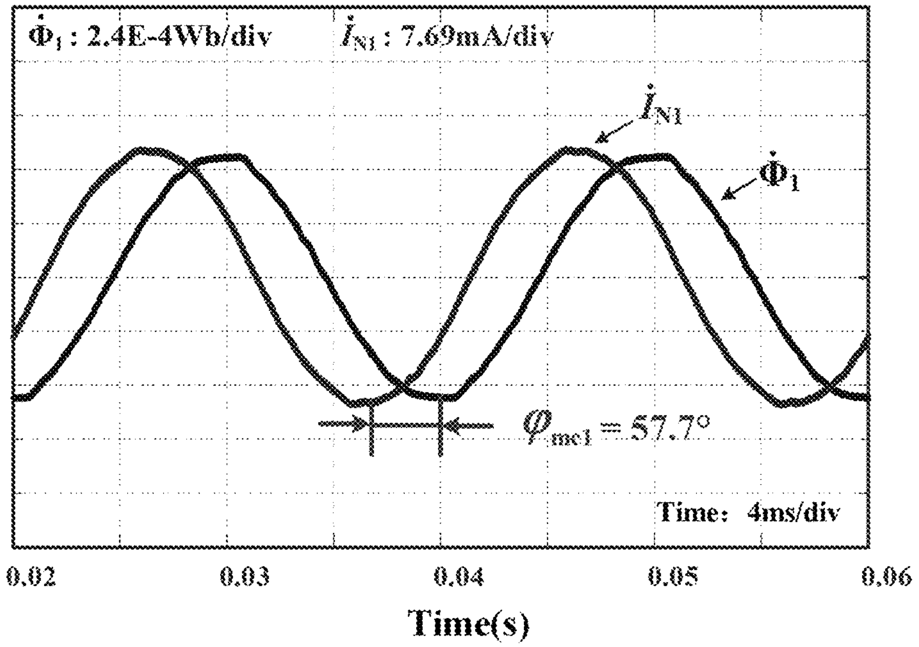
FIG. 6 is a waveform diagram of an excitation current and a magnetic flux of a transformer to which a magnetic-inductance component is added according to the present invention.

An equivalent magnetic circuit diagram to which the magnetic-inductance component is added is shown in FIG. 5. When the excitation voltage $\dot{U}_1$ is stable, the magnetic flux in the magnetic circuit of the transformer remains unchanged. A waveform diagram of the MMF $F_{N1}$ and the magnetic flux $\Phi_1$ in the magnetic circuit of the transformer after the addition of the magnetic-inductance component is shown in FIG. 6. It can be seen that in this case, the magnetic impedance angle of the magnetic circuit of the transformer reaches the target magnetic impedance angle $\varphi_{mc1}$, and the magnetic flux reaches the target magnetic flux $\Phi_1$.

In summary, the present invention provides a magnetic-inductance component. The above are only the preferred embodiments of the present invention, and the scope of protection of the present invention is not limited to the above embodiments. However, all equivalent modifications or changes made by a person of ordinary skill in the art based on the disclosure of the present invention should fall within the protection scope described in the claims.

What is claimed is:

1. A magnetic-inductance component, wherein the magnetic-inductance component comprises a plurality of multi-turn closed coils, each of the plurality of multi-turn closed coils being connected head to tail and wound around a magnetic circuit; wherein an excitation coil is wound around the magnetic circuit, wherein the plurality of multi-turn closed coils are connected in parallel; and a magnetic-inductance value of the magnetic-inductance component is adjusted by selecting metal conductors with different numbers of turns; or lengths to change an amplitude and a phase of a magnetic flux of the magnetic circuit, wherein the magnetic-inductance component is configured to make a state of a magnetic flux vector in the magnetic circuit to be consistent with a target magnetic flux vector state by adding or removing the magnetic-inductance component to or from the magnetic circuit, respectively, wherein the plurality of multi-turn closed coils are copper wires with a cross-sectional diameter of 0.5 mm.

2. The magnetic-inductance component according to claim 1, wherein a coefficient $L_{mc}$ of the magnetic-inductance value of the magnetic-inductance component is related to the number of turns $N_r$ of the closed coil and a resistance $R_r$ of the closed coil, that is, $$L_{mc}=\frac{N_r}{R_r},$$

wherein magnetic-inductance is measured in $\Omega^{-1}$; and when n magnetic-inductance components are connected in series, an expression for an equivalent magnetic-inductance value is $$L_{mceq}=L_{mc1}+L_{mc2}+\ldots+L_{mcn-1}+L_{mcn},$$

inductance components are connected in parallel, an expression for an equivalent magnetic-inductance value is $$L_{mceq}=1/\left(\frac{1}{L_{mc1}}+\frac{1}{L_{mc2}}+\ldots\ \frac{1}{L_{mcn-1}}+\frac{1}{L_{mcn}}\right).$$

3. The magnetic-inductance component according to claim 1, wherein the magnetic-inductance component has an obstructive effect on an alternating magnetic flux, but has no obstructive effect on a constant magnetic flux, an expression for a magnetic reactance is defined as $X_{mc}=\omega L_{mc}$, to describe the degree of the obstructive effect of the magnetic-inductance component on the alternating magnetic flux, wherein ω is an angular frequency of the magnetic flux varied in the magnetic circuit.

4. The magnetic-inductance component according to claim 3, wherein a magnetic impedance value in the magnetic circuit is $$Z_{mc}=\sqrt{R_{mc}^2+X_{mc}^2},$$

and a magnetic impedance angle in the magnetic circuit is $$\varphi_{mc}=\arctan(X_{mc}/R_{mc}),$$

wherein R is a reluctance value of the magnetic circuit.

5. The magnetic-inductance component according to claim 1, wherein the Ohm's law of the magnetic circuit is used to verify whether a set magnetic-inductance value is consistent with a theoretical value; and an Ohm's law expression for the magnetic circuit is $$\dot{F}=(R_{mc}+j\omega L_{mc})\Phi,$$

wherein j represents an imaginary unit, $R_{mc}$ is a reluctance value of the magnetic circuit, ω is an angular frequency of the magnetic flux varied in the magnetic circuit, $L_{mc}$ represents the magnetic-inductance value of the magnetic-inductance component, Φ represents the magnetic flux vector in the magnetic circuit, and $\dot{F}$ represents a magnetomotive force (MMF) vector in the magnetic circuit.

* * * * *